(12) United States Patent
Chen

(10) Patent No.: US 7,333,277 B1
(45) Date of Patent: Feb. 19, 2008

(54) CAP DEVICE FOR MULTIPLE IMAGE DISPLAY

(76) Inventor: Tsan-Yao Chen, 2-1 FL., No. 76, Sec. 3, Hsinsheng North Rd., Taipei City (TW)

( * ) Notice: Subject to any disclaimer, the term of this patent is extended or adjusted under 35 U.S.C. 154(b) by 0 days.

(21) Appl. No.: 11/675,097

(22) Filed: Feb. 15, 2007

(51) Int. Cl.
*G02B 5/04* (2006.01)

(52) U.S. Cl. .................................................. 359/831
(58) Field of Classification Search ........ 359/831–837; 40/505
See application file for complete search history.

(56) References Cited

U.S. PATENT DOCUMENTS

| | | | |
|---|---|---|---|
| 5,485,693 A | * | 1/1996 | Frenken et al. ............. 40/505 |
| 5,692,330 A | * | 12/1997 | Anderson, Jr. ............. 40/505 |
| 2004/0093777 A1 | * | 5/2004 | Park ............................. 40/503 |

* cited by examiner

*Primary Examiner*—Euncha P. Cherry
(74) *Attorney, Agent, or Firm*—Leong C. Lei

(57) ABSTRACT

The cap device contains a number of prisms housed inside a closed space formed by a transparent cover, a ring, and a base. Gear teeth are provided along the inner circumference of the ring, which engage a gear member of the cap device to drive a passive gear located at an end of one of the prisms. As the other ends of the prisms are connected by a shaft of the cap device, all prisms are rotated synchronously. For every 120° spin of the prisms as the ring is turned, the faces of the prisms are aligned to face upward, and the images on the faces jointly form a complete image. As such, three complete images are revealed sequentially and continuously as the ring is turned in one direction.

2 Claims, 7 Drawing Sheets

CAP DEVICE FOR MULTIPLE IMAGE DISPLAY

TECHNICAL FIELD OF THE INVENTION

The present invention generally relates to caps and more particularly to a cap device having a number of prisms and, by aligning the various faces of the prisms, displaying various images.

DESCRIPTION OF THE PRIOR ART

In today's beverage product market, drinks are usually sold in cups or bottles. The smart business men have long been utilizing the outside of the cups or bottles for advertisement or for delivering marketing information. However, the caps are, most of time, still to serve only one purpose: sealing the content of the bottles or cups.

Even though some cup or bottle caps are given some special form factors, graphical patterns, or even dolls, these caps are still rather inflexible as a vehicle for advertisement or marketing.

SUMMARY OF THE INVENTION

Therefore, a novel cap device is taught herein, which provides the display of three different images.

The cap device contains a number of prisms housed inside a closed space formed by a transparent cover, a ring, and a base. Gear teeth are provided along the inner circumference of the ring, which engage a gear member of the cap device to drive a passive gear located at an end of one of the prisms. As the other ends of the prisms are connected by a shaft of the cap device, all prisms are rotated synchronously. For every 120° spin of the prisms as the ring is turned, the faces of the prisms are aligned to face upward, and the images on the faces jointly form a complete image. As such, three complete images are revealed sequentially and continuously as the ring is turned in one direction.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
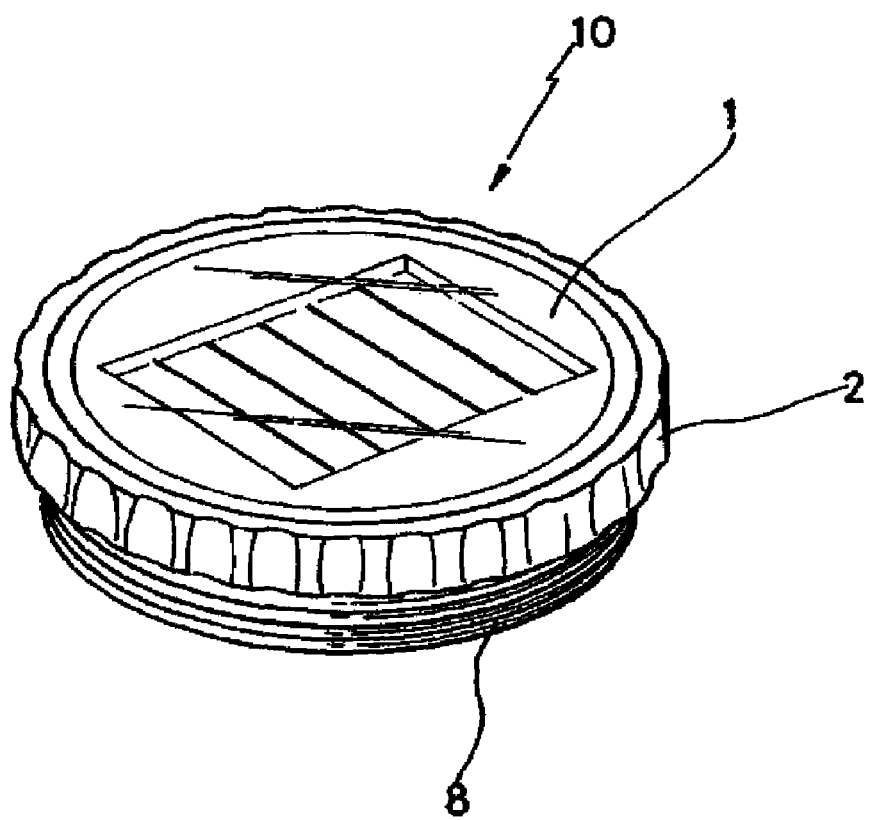
FIG. 1 is a perspective diagram showing a cap device according to an embodiment of the present invention for use as a cup cap.
Figure 7:
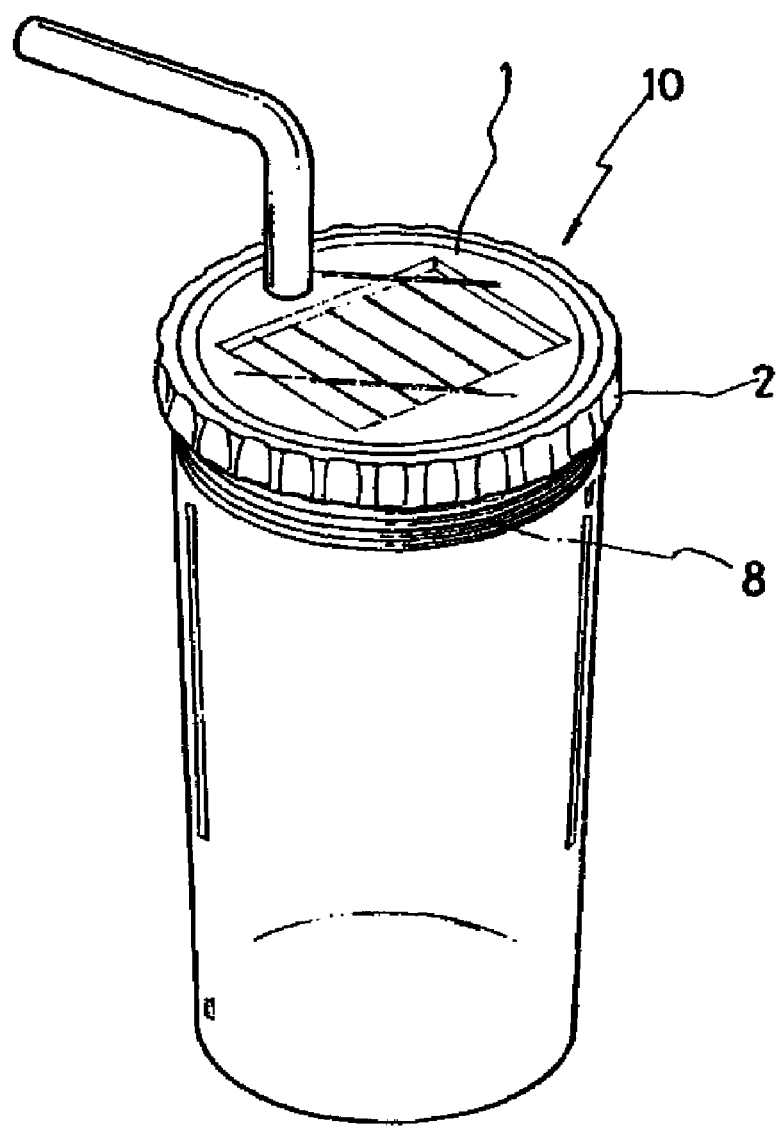
FIG. 7 shows an application of the cap device of FIG. 1 as a cup cap.
Figure 8:
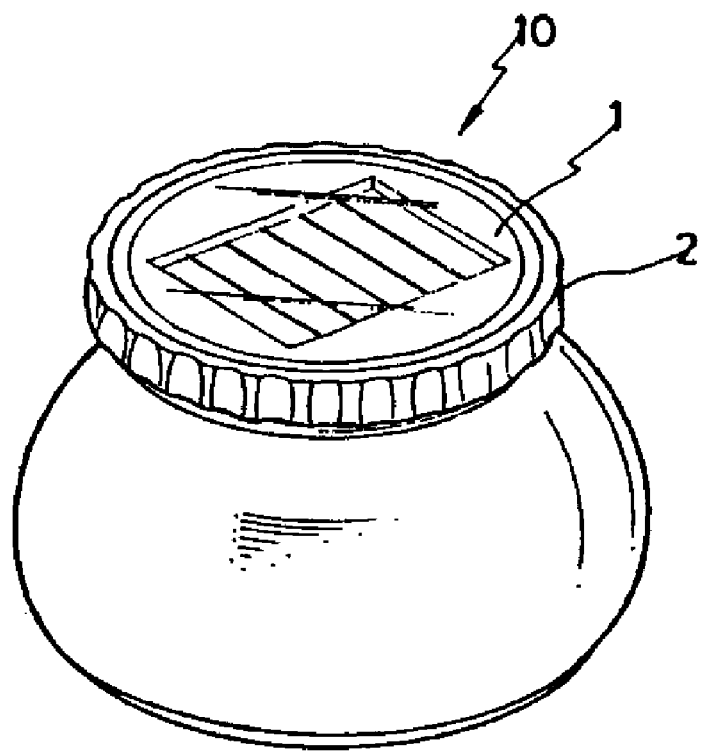
FIG. 8 shows another application of the cap device of FIG. 1 as a bottle cap.

FIG. 1 is a perspective diagram showing a cap device 10 according to an embodiment of the present invention for use as a cup cap shown in FIG. 7 or as a bottle cap shown in FIG. 8. The cap device 10 contains a number of prisms 3 (see FIG. 2) housed inside a closed space formed by a transparent cover 1, a ring 2, and a base 8. Each prism 3 contains three faces: namely, the first face, the second face, and the third face. As the ring 2 is turned, the prisms 3 spin together synchronously. When the first faces of the prisms 3 are aligned to face upward, the images on the first faces jointly form a complete first image. After a 120° spin, the second faces of the prisms 3 are aligned and their images on the second faces jointly form a complete second image. After another 120° spin, the third faces of the prisms 3 are aligned and their images on the third faces jointly form a complete third image. As such, the first, second, and third images will be revealed sequentially and continuously as the ring 2 is turned in one direction.

Figure 2:
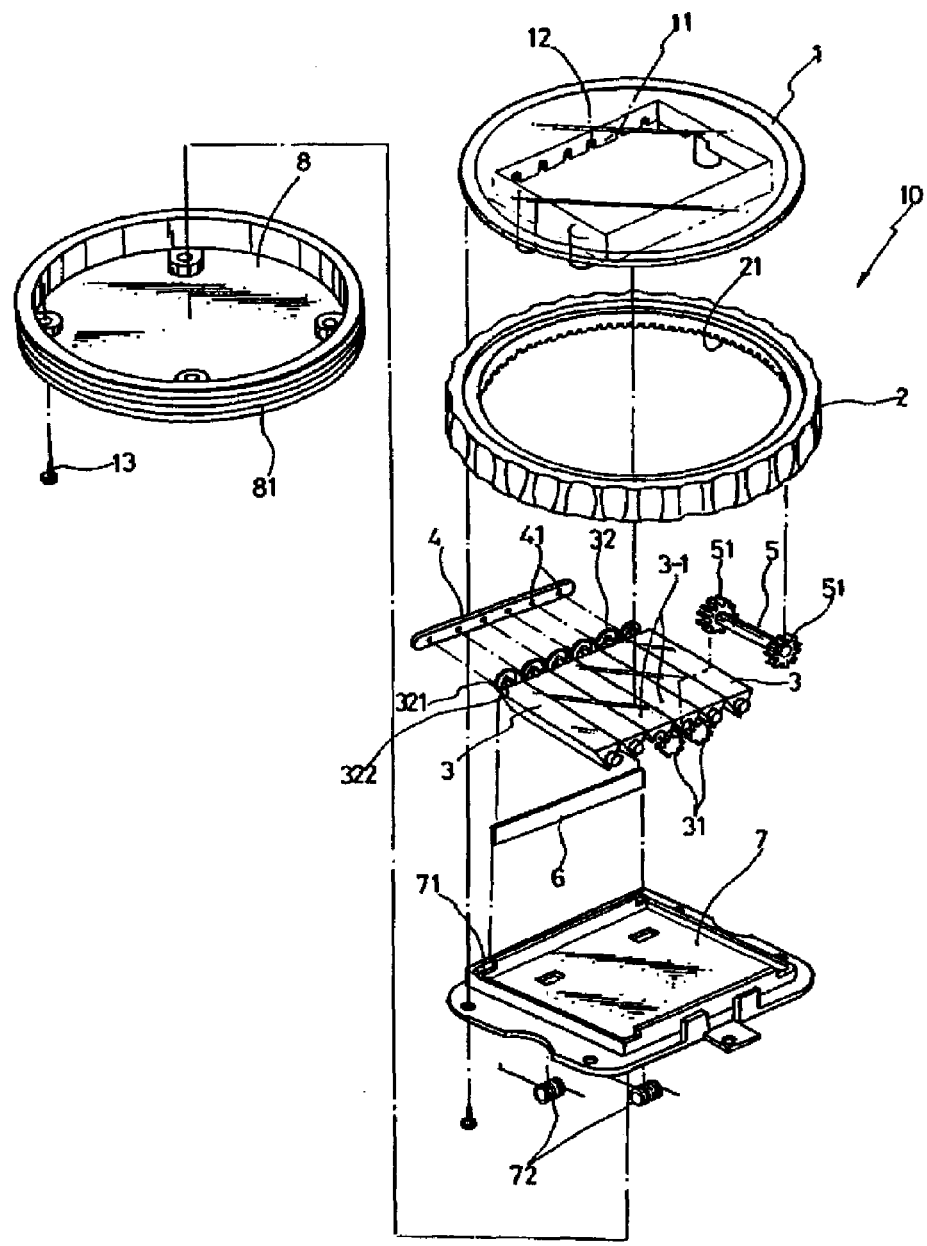
FIG. 2 is a perspective exploded diagram showing the various components of the cap device of FIG. 1.

To achieve the aforementioned effect, as shown in FIG. 2, the cap device 10 further contains a shaft 4, a gear member 5, a positioning strip 6, and a seat 7. The base 8 provide a hollow space surrounded by a wall. The cover 1 is joined to the base 8 by a number of bolts 13 with the ring 2 rotatably sandwiched therebetween, thereby forming the closed space where the prisms 3, the shaft 4, the gear member 5, the positioning strip 6, and the seat 7 is housed.

Figure 3:
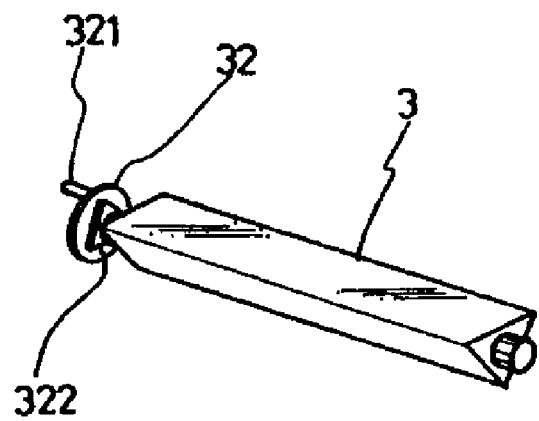
FIG. 3 is a perspective diagram showing the prism of the cap device of FIG. 1.

As shown in FIG. 3, a round piece 32 is fixedly and axially attached to an axle (not numbered) on a first end of each prism 3. On the surface of the round piece 32 that faces the prism 3, a triangular flange 322 is provided and, on the other surface, a handle 321 is extended in the axial direction near the rim of the round piece 32. The handles 321 of the prisms 3 are plugged into a number of holes 41 located along the shaft 4 at equal spacing therebetween. The handles 321, the round pieces 32, and the prisms 3 are configured such that, when the handles 321 are plugged into the shaft 4, the first, second, or third faces of the prisms 3 are aligned. As such, when one of the prisms 3 is rotated, the rest of the prisms 3 are rotated synchronously as well due to the configuration of the shaft 4. Therefore, after the prisms 3 are rotated together for every 120°, the first, second, or third faces of the prisms 3 will be aligned and the first, second, or third image will be presented.

Figure 4:
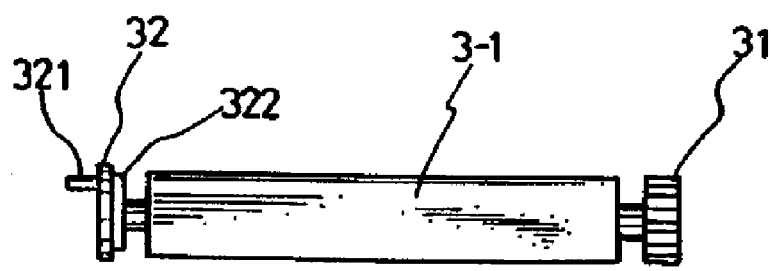
FIG. 4 is a profile diagram showing the driving prism of the cap device of FIG. 1.
Figure 5:
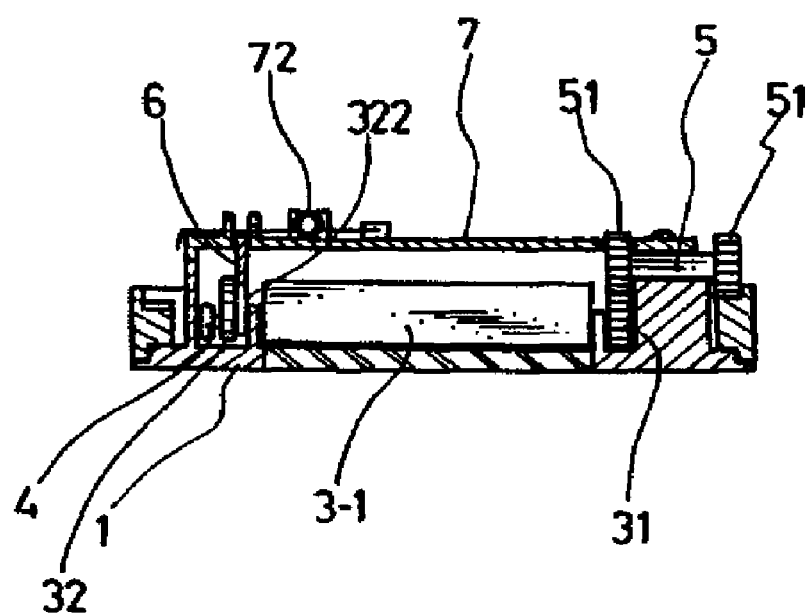
FIG. 5 is a sectional-view diagram of the cap device of FIG. 1.
Figure 6:
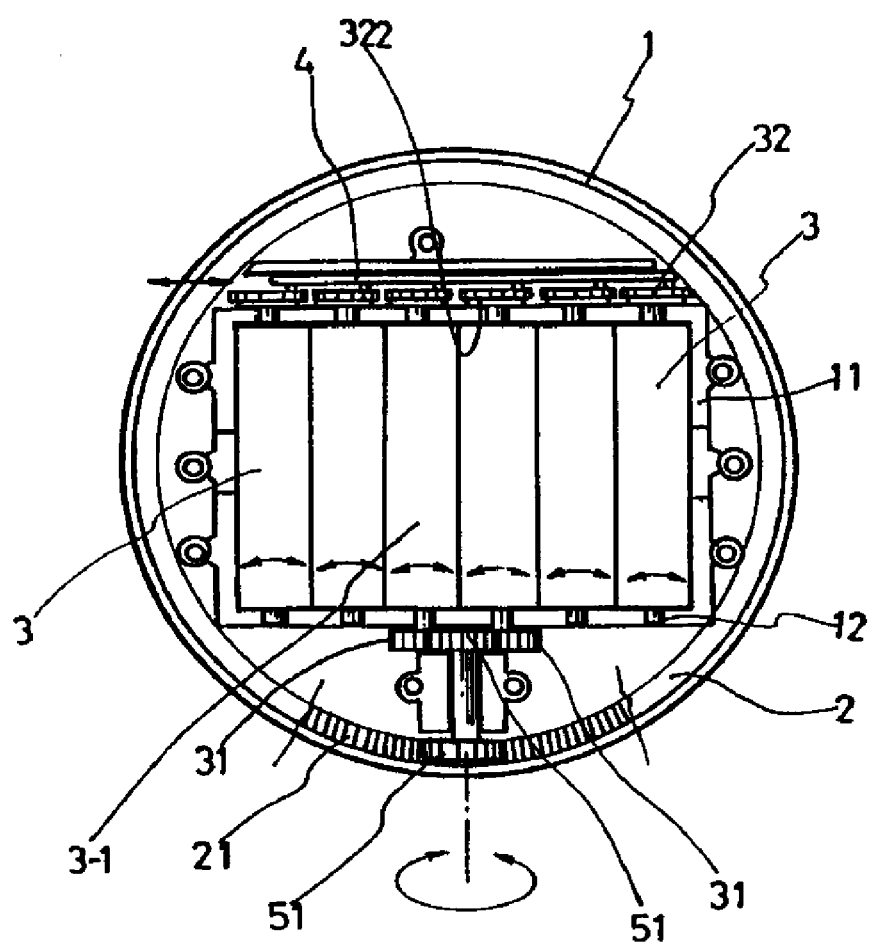
FIG. 6 is a top-view diagram showing the inside of the cap device of FIG. 1.

Two adjacent prisms 3 (usually the two positioned in the middle) are different from the others. As shown in FIG. 4, each of the two prisms, hereinafter the driving prisms 3-1, has a passive gear 31 on its second end. On the other hand, the gear member 5 contains two gears 51 on the two ends of an axle, respectively. As shown in FIGS. 5 and 6 (please note that FIG. 5 is drawn up-side-down), one of the gears 51 engages the passive gears 31 of the driving prisms 3-1 and the other gear 51 is engaged by the gear teeth 21 arranged continuously around the inner circumference of the ring 2. Therefore, when the ring 2 is turned, the gear member 5 is driven, which in turn rotates the driving prisms 3-1. As explained earlier, due to the shaft 4's connection, the other prisms 3 are rotated synchronously.

The prisms 3, including the driving prisms 3-1, and the shaft 4 are horizontally placed upon the seat 7. The positioning strip 6 is inserted into a through slot 71 of the seat 7 so that the positioning strip 6 is right beneath the axles on the first ends of the prisms 3. As shown in FIG. 5, a number of elastic elements 72 are attached to the bottom of the seat 7 to support the bottom of the positioning strip 6. Please note that the prisms 3 and their triangular flanges 322 are oriented in opposite directions. As such, when the prisms 3 have one of their faces aligned, the triangular flanges 322 would have one of their sides landed on the positioning strip 6. Therefore, every time the ring 2 is turned and the prisms 3 are rotated for 120° to have one of their faces aligned, one of the first, second, or third image is steadily presented as the triangular flanges 322 are reliably and elastically supported by the positioning strip 6. During the rotation before an alignment of the prisms 3 is reached, the positioned strip 6 sinks to facilitate the rotation of the triangular flanges 322 by suppressing the elastic elements 71. Once the prisms 3 are aligned, the elastic elements 71 expand to raise the positioning strip 6 which in turn provides a firm support to the triangular flanges 322.

To better position the prisms 3, the transparent cover 1 provides a frame 11 on its bottom side in which the prisms 3 are housed. As shown in FIG. 2, a number of notches 12 are provided along an edge of the window 11 so that the axles on the first ends of the prisms 3, while supported from below by the positioning strip 6, are rotatably embedded into the notches 12, respectively. Also shown in FIG. 2, threads 81 can be provided around the outer circumference of the base 8 so that the cap device 10 can be screwed onto a cup or a bottle as shown in FIGS. 7 and 8.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A cap device for sealing an opening of a container, comprising:
   a ring having a plurality of gear teeth provided along the inner circumference of said ring;
   a base;
   a transparent cover joined to said base with said ring rotatably sandwiched therebetween, thereby forming a closed space therewithin;
   a seat having a through slot and a plurality of elastic elements attached to the bottom of said seat;
   a positioning strip positioned inside said through slot and supported from the bottom by said elastic element;
   a plurality of prisms positioned above said seat, said prisms horizontally arranged side-by-side and oriented toward the same direction, each prism containing a first face, a second, and a third face, said first, second, and third faces having images, respectively, each prism having a triangular flange and a handle at a first end, at least one of said prisms having a passive gear at a second end, said triangular flanges being supported by said positioning strip, and said triangular flanges and said prisms oriented towards opposite directions;
   a gear member having two gears at the two ends of an axle, respectively, one of said gears engaging said passive gear of said prism, and the other gear being engaged by said gear teeth of said ring;
   a shaft having a plurality of holes receiving said handles of said prisms, respectively;
   wherein said seat, said positioning strip, said prisms, said gear member, and said shaft are housed inside said closed space; said prisms have one of their first, second, or third face aligned and faced upward; as said ring is turned in one direction, said first, second, and third faces of said prisms are aligned sequentially to face upward and, as the images on said faces jointly form a complete image, three complete images are therefore presented sequentially.

2. The cap device according to claim 1, wherein said base has threads around the outer circumference for fixing said cap device onto said opening of said container.

* * * * *